United States Patent
Meller et al.

(10) Patent No.: US 8,453,138 B2
(45) Date of Patent: May 28, 2013

(54) METHOD AND APPARATUS FOR GENERATING AN UPDATE PACKAGE

(75) Inventors: Evyatar Meller, Petach-Tikva (IL); Sharon Peleg, Ramat Hasharon (IL)

(73) Assignee: Red Bend Ltd., Hod Hasharon (IL)

( * ) Notice: Subject to any disclaimer, the term of this patent is extended or adjusted under 35 U.S.C. 154(b) by 1516 days.

(21) Appl. No.: 11/578,345

(22) PCT Filed: Apr. 13, 2005

(86) PCT No.: PCT/IL2005/000392
§ 371 (c)(1),
(2), (4) Date: Nov. 9, 2007

(87) PCT Pub. No.: WO2005/101200
PCT Pub. Date: Oct. 27, 2005

(65) Prior Publication Data
US 2008/0196019 A1 Aug. 14, 2008

Related U.S. Application Data

(60) Provisional application No. 60/561,548, filed on Apr. 13, 2004.

(51) Int. Cl.
*G06F 9/44* (2006.01)
*G06F 9/445* (2006.01)

(52) U.S. Cl.
USPC .................. 717/170; 717/169; 717/175

(58) Field of Classification Search
None
See application file for complete search history.

(56) References Cited

U.S. PATENT DOCUMENTS

| | | | |
|---|---|---|---|
| 6,018,747 A | 1/2000 | Burns et al. | |
| 6,363,499 B1 * | 3/2002 | Delo et al. | 714/15 |
| 6,546,552 B1 | 4/2003 | Peleg | |
| 6,789,255 B1 * | 9/2004 | Pedrizetti et al. | 717/169 |
| 6,802,025 B1 * | 10/2004 | Thomas et al. | 714/15 |
| 6,832,373 B2 | 12/2004 | O'Neil | |

(Continued)

FOREIGN PATENT DOCUMENTS

| WO | WO 2004/114130 A2 | 12/2004 |
|---|---|---|
| WO | WO 2005/003963 A2 | 1/2005 |

OTHER PUBLICATIONS

Elliott et al., Free software developers as an occupational community: resolving conflicts and fostering collaboration, Nov. 2003, 10 pages, <http://delivery.acm.org/10.1145/960000/958164/p21-elliott.pdf>.*

(Continued)

*Primary Examiner* — Thuy Dao
(74) *Attorney, Agent, or Firm* — Buchanan Ingersoll & Rooney PC

(57) ABSTRACT

Method and apparatus for generating an update package. The update package is capable of in-place updating an old version to a new version wherein the old and new versions are stored in a storage device. The method includes inserting update commands into the update package, wherein the update commands allow updating the old version to the new version. The method further includes checking the update commands for determining whether they create at least one conflict, and if so, selecting one conflict out of the at least one conflict, wherein content overridden in said one conflict requires protection. A protection command allowing protection of the content before it is being overridden and a restoration command allowing restoration of the content with the protected content after it was overridden are also inserted into the update package.

15 Claims, 8 Drawing Sheets

U.S. PATENT DOCUMENTS

| | | | |
|---|---|---|---|
| 7,191,438 B2* | 3/2007 | Bryant | 717/176 |
| 7,322,030 B1* | 1/2008 | Boodro et al. | 717/170 |
| 7,386,845 B1* | 6/2008 | Fox et al. | 717/170 |
| 7,716,664 B2* | 5/2010 | Hughes et al. | 717/175 |
| 7,735,078 B1* | 6/2010 | Vaidya | 717/171 |
| 7,873,960 B2* | 1/2011 | Templin et al. | 717/175 |
| 8,225,302 B2* | 7/2012 | Waugh et al. | 717/170 |
| 2001/0051519 A1 | 12/2001 | Shirai | |
| 2003/0225986 A1 | 12/2003 | Teshima | |
| 2004/0015946 A1* | 1/2004 | Te'eni et al. | 717/169 |
| 2005/0155031 A1* | 7/2005 | Wang et al. | 717/170 |

OTHER PUBLICATIONS

Scheffczyk et al., Managing inconsistent repositories via prioritized repairs, Oct. 2004, 10 pages, <http://delivery.acm.org/10.1145/1040000/1030426/p137-scheffczyk.pdf>.*

* cited by examiner

METHOD AND APPARATUS FOR GENERATING AN UPDATE PACKAGE

RELATED APPLICATIONS

This application claims the priority benefit of commonly assigned U.S. Provisional Application No. 60/561,548, filed Apr. 13, 2004, entitled "Method and Apparatus for Generating and Update Package" by Evyatar MELLER et al., and to PCT Application No. PCT/IL2005/000392, filed Apr. 13, 2005, entitled "Method and Apparatus for Generating and Upate Package" by Evyatar MELLER et al.

FIELD OF THE INVENTION

This invention relates to generating an update package and for updating versions stored in storage devices using an update package.

BACKGROUND OF THE INVENTION

It is sometimes required to update content stored in a storage device. For example, if the content is software (such as an executable file), it is sometimes required to fix a bug in it or to update it thus generating a newer version. Hereinafter the term "old version" or "original version" refers to content before update, the term "new version", or "updated version" refers to the content after it was updated, the term "update process" refers to the process that performs the update of the storage content and the term "update package" or "delta file" refers to the data which is used by the update process in addition to the old version.

There are several ways known in the art for generating update packages and using them for updating versions. For example, U.S. Pat. No. 6,546,552 ("Difference extraction between two versions of data-tables containing intra-references", published 2003) discloses a method for generating a compact difference result between an old program and a new program. Each program includes reference entries that contain references that refer to other entries in the program. According to the method of U.S. Pat. No. 6,546,552, the old program is scanned and for each reference entry, the reference is replaced by a distinct label mark, whereby a modified old program is generated. In addition, according to U.S. Pat. No. 6,546,552, the new program is scanned and for each reference entry the reference is replaced by a distinct label mark, whereby a modified new program is generated. Thus, utilizing directly or indirectly the modified old program and modified new program, the difference result is generated.

WO 2004/114130 ("Method and system for updating versions of content stored in a storage device", published 2004) discloses a system and method for generating a compact update package between an old version of content and a new version of content. The system of WO 2004/114130 includes a conversion element generator for generating a conversion element associated with the old version and new version. It also includes a modified version generator for generating a modified version, and an update package generator for generating the compact update package. The compact update package includes the conversion element and a modified delta based on the modified version and the new version.

WO 2005/003963 ("Method and system for updating versions of content stored in a storage device", published 2005) discloses a system and method for updating versions of content stored in a storage device. The system of WO 2005/003963 includes an update module for obtaining a conversion element and a small delta. It also includes a converted old items generator for generating converted old items by applying the conversion element to items of an old version, a data entries generator for generating data entries based on the modified data entries and on the converted old item, and a new version generator for generating a new version of content by applying the commands and the data entries to the old version.

U.S. Pat. No. 6,832,373 ("System and method for updating and distributing information", published 2004) discloses devices, systems and methods for updating digital information sequences that are comprised by software, devices, and data. In addition, these digital information sequences may be stored and used in various forms, including, but not limited to files, memory locations, and/or embedded storage locations. Furthermore, the devices, systems, and methods described in U.S. Pat. No. 6,832,373 provide a developer skilled in the art with an ability to generate update information as needed and, additionally, allow users to proceed through a simplified update path, which is not error-prone, and may be performed more quickly than through the use of technologies existing when U.S. Pat. No. 6,832,373 was filed.

It can be appreciated that sometimes, two versions of the same content contain common parts which appear both in the old and the new versions. It can be also appreciated that the position of these common parts need not necessarily be the same in both versions and that they can change their position. Update methods known in the art such as delta-update methods take advantage of the common parts, and use update packages that contain instructions for copying the common parts as well as other changes that together enable the update process to create a the desired new version.

It is known to persons versed in the art that content is stored in a storage device, such as disk or memory. Also, sometimes the new version can use the same storage area previously occupying the old version. For example, if the available storage in the device is limited in space, it can be preferred to store the new version in place of the old version, saving space thereby. Such an update process, where the new version occupies at least some of the space previously occupied by the old version, is referred in the art as "in-place update" or "updating in-place".

One of the outcomes of this method is that once a storage area has been updated, its previous content being part of the old version is lost. When performing an in-place update, one has to take care of the reliability of the update process and enable it to properly resume after an unexpected interrupt such as power failure. Methods to handle the reliability of such process are known in the art. The prior art shows how to insure the reliability of an in-place update process by using state-memory and backup buffer; Since interruptions may leave some memory area corrupted, an in-place update process can back-up any content intended to be written on a specially designated backup buffer, creating a copy of the content thereby, and only upon successful creation of the copy, the area of the storage to be updated is being modified. This technique is sometimes referred in the art as '2-phase committing'. Another requirement of the reliability of such update process is to keep state information indicative of progress of the update process properly saved in a storage device so that a resuming update process will be able to restore its condition as what was exactly before the interruption and be able to continue properly as if the interruption never occurred. This requirement is achieved by the prior art by recording every successful update step in a non-volatile storage area in such way that a resuming update process can read and use it in order to start with a state substantially similar to the state of the update interrupted process.

Those versed in the art will appreciate that many storage devices include identified areas in them. For example, hard drives include sectors and so do flash memory modules. An identified area in a storage device is referred to as a "storage block". It is noted though that hard drives and flash memory modules are only two examples of a storage device. There are other known per se storage devices such as Random Access Memory (RAM) etc. It should be further noted that the term "block" or "region" is used hereinafter to refer to an identified area in the content of one or both versions.

A known problem in the art occurs when blocks in the new version which are matched to corresponding blocks in the old version, change position and sometimes change also their order during in-place update, where the storage of the new version occupies at least part of the same storage area as of the old version.

There are methods known in the art for performing in-place update, amongst which are those methods generally known as "delta-update", or "update package update", wherein an update process operates in accordance with an update package or a delta file. Basically, in accordance with those methods, areas in the storage which do not change their content except for their position, are being copied and moved to their position in the new version instead of generating them from new. Specifically, when performing an in-place update, blocks' copying must be performed with care since the target location of these blocks may contain data still necessary to the update process for operations performed after the copy. This problem is known in the art sometimes as 'collisions' or 'write-before-read conflicts', hereinafter called 'conflicts'. In some cases, conflicts can be simply avoided by determining the correct order of the copying the blocks, hereinafter called 'copy-order'. Resolving conflicts starts by copying a block to a place that does not accommodate data that is still needed for future operations, and freeing at the area occupied by that block before it was copied (i.e., the corresponding block in the old version) and continues by copying blocks only to places that are free, until no more blocks can be copied into free places.

It should be noted, that sometimes, these series of copy operations may form a cycle, where a block's new position overlaps another block's old position whose new position overlaps another's old position and so on until the a block with a new position that overlaps the first block's old position. Hereinafter these cycles are referred as 'copy-cycles'. It is know in the art that such copy-cycles creates groups of conflicts for which there is no copy-order by which all the group's conflicts will be resolved and at least one will remain unresolved.

U.S. Pat. No. 6,018,747 ("Method for generating and reconstructing in-place delta files", published 2000) discloses a method, apparatus, and article of manufacture for generating, transmitting, replicating, and rebuilding in-place reconstructible software updates to a file from a source computer to a target. U.S. Pat. No. 6,018,747 stores the first version of the file and the updates to the first version of the file in the memory of the source computer. The first version is also stored in the memory of the target computer. The updates are then transmitted from the memory of the source computer to the memory of the target computer. These updates are used at the target computer to build the second version of the file in-place.

According to U.S. Pat. No. 6,018,747, when a delta file attempts to read from a memory offset that has already been written, this will result in an incorrect reconstruction since the prior version data has been overwritten. This is termed a write before read conflict. U.S. Pat. No. 6,018,747 teaches how to post-process a delta file in order to create a delta file minimize the number of write before read conflicts and then replace copy commands with add commands to eliminate conflicts. A digraph is generated, for representing the write before read conflicts between copy commands. A schedule is generated that eliminates write before read conflicts by converting this digraph into an acyclic digraph.

There is a need in the art, thus, for an efficient and fast in-place update mechanism.

SUMMARY OF THE INVENTION

It is therefore an object of the invention to provide method and apparatus for generating update packages adaptable for an efficient and fast in-place update, and a method for applying these update packages during update.

The present invention provides a method for generating an update package, said update package is capable of in-place updating an old version to a new version wherein the old and new versions are stored in a storage device, the method comprising:

a. inserting update commands into the update package, the update commands allow updating said old version to said new version;

b. checking the update commands for determining whether they create conflicts;

c. if the update commands create at least one conflict, i. selecting one conflict out of the at least one conflict, wherein content overridden in said one conflict requires protection;

ii. inserting into the update package a protection command allowing protection of the content before it is being overridden; and iii. inserting into the update package a restoration command for allowing restoration of the content with the protected content after it was overridden.

The present invention also provides a method for generating an update package, said update package is capable of in-place updating an old version to a new version wherein the old and new versions are stored in a storage device, the method comprising:

a. obtaining update commands allowing updating said old version to said new version;

b. checking the update commands for determining whether they create conflicts;

c. if the update commands create at least one conflict, i. selecting one conflict out of the at least one conflict, wherein content overridden in said one conflict requires protection;

ii. adding to said update commands a protection command allowing protection of the content before it is being overridden; and iii. adapting the update commands to resolve the one conflict by employing content protected by the protection command.

The present invention further provides an apparatus for generating an update package, said update package is capable of in-place updating an old version to a new version wherein the old and new versions are stored in a storage device, the apparatus comprising:

a. a commands generator for inserting update commands into the update package, the update commands are capable of updating said old version to said new version;

b. a conflict determining module for checking the update commands, determining whether they create at least one conflict;

c. a conflict selector coupled with the conflict determining module, for selecting one conflict out of the at least one conflict determined by the conflict determining module; and d. a protection commands generator coupled with the conflict selector for inserting a protection command and a restoration command into said update package, the protection command and restoration command allow resolving the one conflict.

Still further the present invention provides a method for in-place updating an old version of a content stored on to a storage device giving rise to a new version, the method comprising:

a. receiving an update-package, said update-package includes:
  i. update commands for updating said old version to said new version which do not override protected data;
  ii. update commands for updating said old version to said new version which override protected data;
  iii. protection commands for protecting said protected data;
  iv. restoration commands for restoring said protected data; and
b. performing said in-place update in accordance with said update package.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

The method of U.S. Pat. No. 6,018,747 resolves the remaining unresolved conflicts for all copy-cycles but at the expense of enlarging the update package mainly by inserting data blocks into it.

Some devices such as mobile phones receive update packages through limited communication means such as wireless transmission. Also, it is sometimes desired to separate in time between the receipt of the update package and the execution of the update process. This is desired, for example, when the updated content includes code that handles the transmission. Such a constraint creates the need for storing-ahead a completely received update package on to a storage device and only when fully received and properly stored, the update process is being performed. When an update package is received and stored-ahead, it is appreciated that the size of the update package should be minimized, saving transmission time and storage space. For example, updating the software of a mobile telephone may require that the telephone will not be operable during the update process, meaning it can not perform communication at the same time. Mobile telephones also are designed to have very limited spare storage space since their storage devices (such as flash memory and other available technologies) are expensive.

Figure 1:
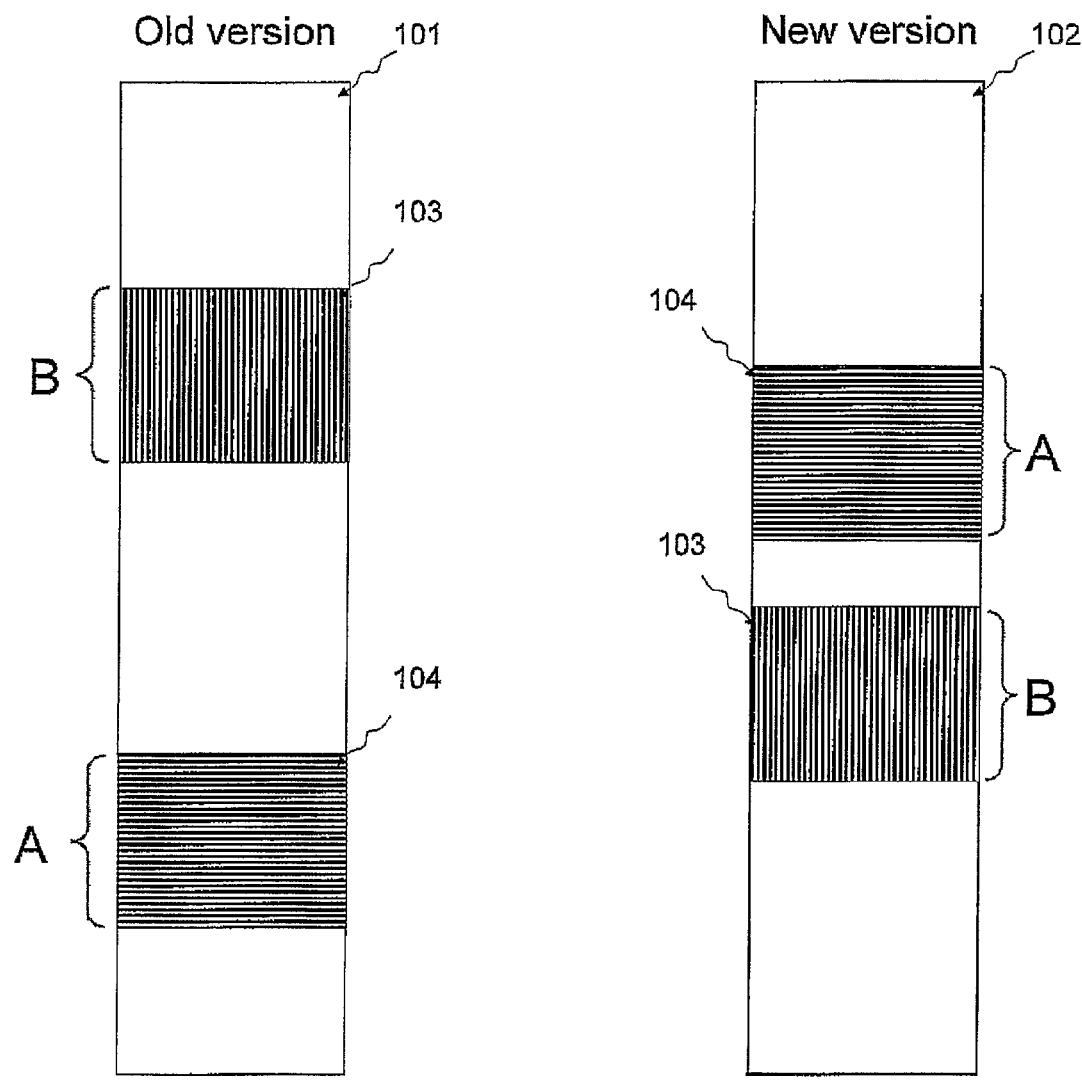
FIG. 1 is a block diagram illustrating matched blocks between old and new versions.
Figure 1A:
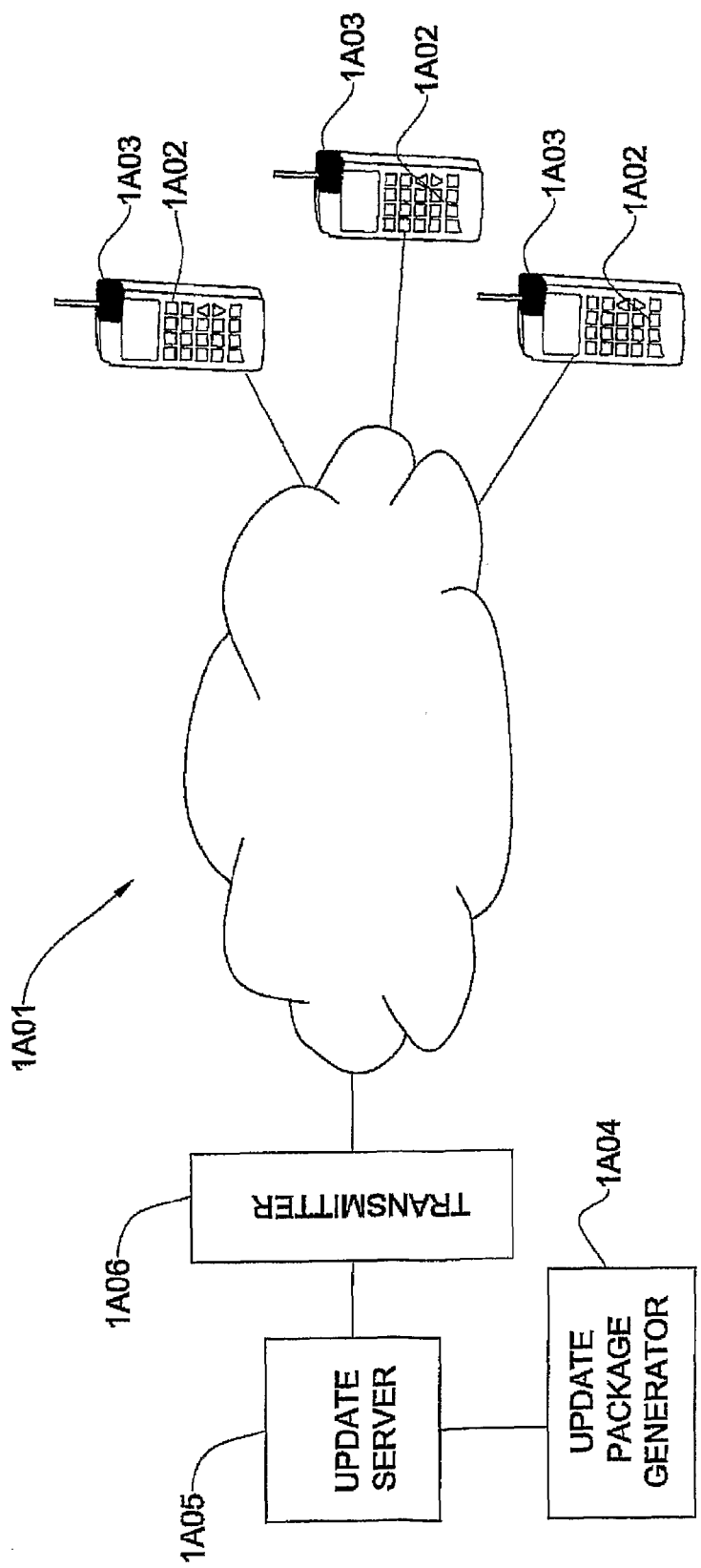
FIG. 1A is a schematic illustration of a system for updating versions in a cellular network, in accordance with one embodiment of the invention.

FIG. 1A is a schematic illustration of a system 1A01 for updating versions in a cellular network, in accordance with one embodiment of the invention. Cellular telephones 1A02 that are coupled with or include memory devices 1A03, execute programs that enable their operation. Programs are normally stored in files. The version of the program currently executing on the cellular telephones is referred to, hereinafter, as an "old version" or as an "original version".

It is noted that memory devices, such as the memory devices 1A03, are sometimes referred to also as "storage devices" or "memory units".

Sometimes there is a need to update the programs in order for the telephones 1A02 to execute a newer version thereof. Such an updated version is generated by an update process operating in the telephone. The update process operates in accordance with an update package (constituting a "delta file") that the telephone receives.

According to the invention, an update package is generated in an update package generator 1A04, operating, for example, in a personal computer (PC) or in any other type of computer. The update package is stored in an update server 1A05 and transmitted, via a transmitter 1A06 to the cellular telephones 1A02.

It should be noted that the system 1A01 illustrated in FIG. 1A is a non-binding example and the invention is not limited to updating programs. Many other types of content stored in storage devices require update, such as data stored in databases, files stored in the storage device etc. Therefore, hereinafter the term "content" will be used instead of "program".

In the same way, the invention is not limited to cellular networks and/or to cellular telephones 1A02. It should be appreciated that cellular telephones belong to a group referred to as embedded devices. There are other embedded devices, such as Personal Digital Assistants (PDAs), set-top boxes and other consumer electronic devices that are coupled with storage devices for storing content, and sometimes it is required to update the content stored therein. Yet, it is possible to update also content stored in storage devices coupled with non-embedded devices, such as PCs or other computers. Therefore, the storage devices 1A03 can be, for example, hard-disk drives, Flash-memory devices or any other storage device.

For example, a PC, or any other computer, can store files that include data required for its operation or for operation of programs executing therein (such as "info files" or "dot files" known for those versed in the art). Sometimes it is required to update this data, for example, via communications lines, e.g., via the internet or via any other communication means.

Understanding this, instead of using terms such as "telephones", "PDAs" "consumer electronic devices", "computer", "PC", etc., the term "updated devices" will be used hereinafter, and it should be noted that the term an "update device" can refer to any device that is coupled with a storage device and allows updating content stored therein.

It was previously explained that in order to update content stored in the storage devices, update packages are generated, stored in the update server 1A05 and conveyed to the storage devices or to other devices coupled therewith (such as the cellular telephones 1A02). Alternatively, it is possible to convey an update package without storing it first in an update server 1A05. For example, it is possible to convey the update package directly from the update package generator where it is generated. In such a case the machine where the update generator operates or the update generator itself is considered as the update server 1A05.

Furthermore, in the example illustrated in FIG. 1A the update package is conveyed via the transmitter 1A06. This is also non-binding and any other way applicable for conveying the update package can be used. For example, it is possible to store the update package on a portable storage device such as a floppy disk or disk on key thus allowing an updated device (such as the telephones 1A02) to access the update package by reading it therefrom.

When a cellular telephone 1A02 receives an update package, it can operate an update process in accordance with the update package, wherein the update process updates the original version for generating another version referred to as an "updated version" or as a "new version". It should be noted that the cellular telephone 1A02 can operate the update process immediately after receiving the update package. Alternatively it can store the update package in a non-volatile memory, such as in the storage device 1A03, and operate the update process in some later time (such as on the next time the telephone reboots).

FIG. 1 illustrates an example of old (101) and new (102) versions having matched blocks. By this example, two blocks, referenced by 103 and 104 in the old version are matched to their corresponding blocks in the new version. That is, the contents of 103 and 104 are found also in the new version. The example illustrate that corresponding blocks in the new version change their position and their relative order not necessarily keep the same relative order.

Figure 2:
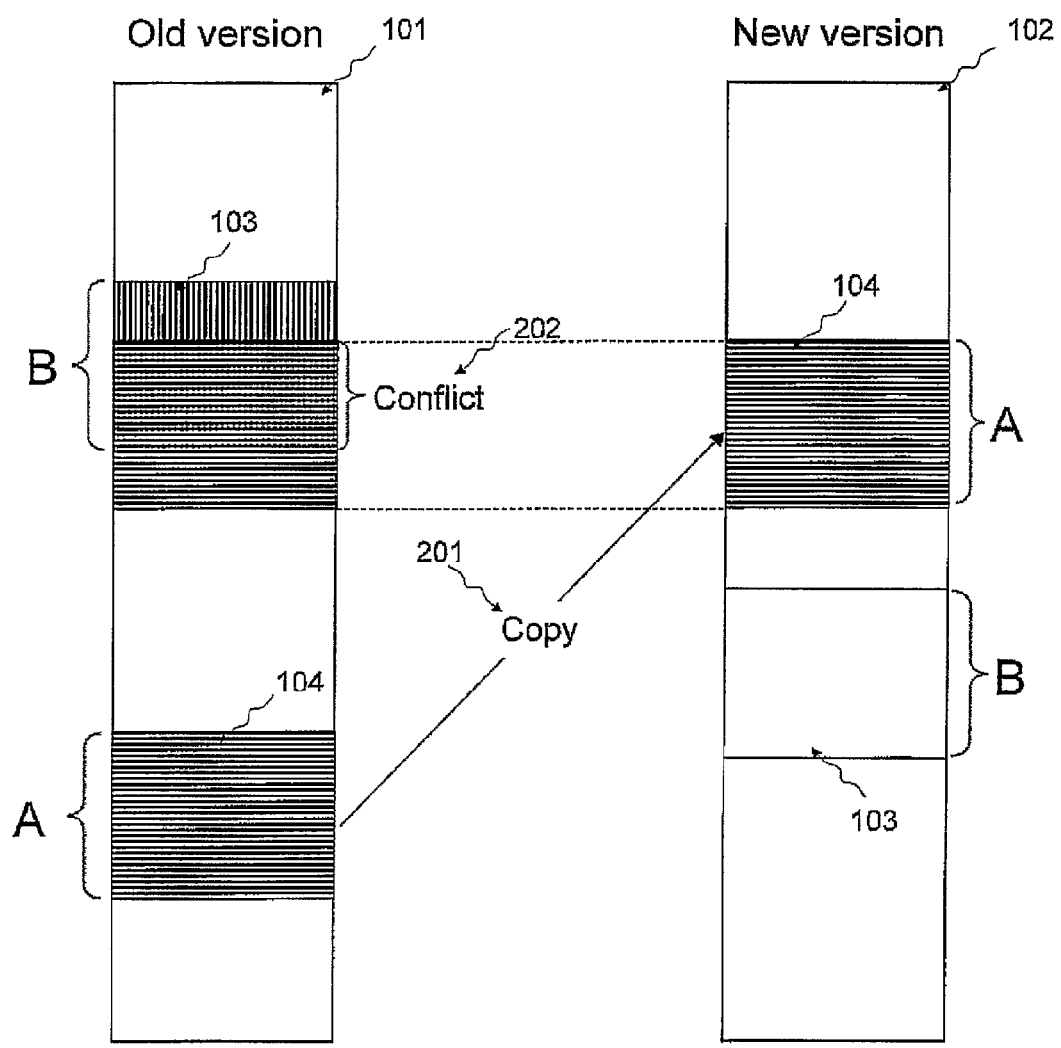
FIG. 2 is a block diagram illustrating a known problem in the art sometimes referred as 'write-before-read conflict'.

FIG. 2 illustrates a 'write-before-read' conflict. The update process, in this example, copies (201) block 104 to its new position, overriding a portion of block 103 thereby. This overriding creates a conflict (202) due to the overlapping of the new position in the storage device of 104 in the new version and 103 in the old one. If it is required to further copy 103 to a new position, the content of the block will be altered (containing a portion whose content belongs to 104) and will not contain the expected original content of 103.

Figure 3:
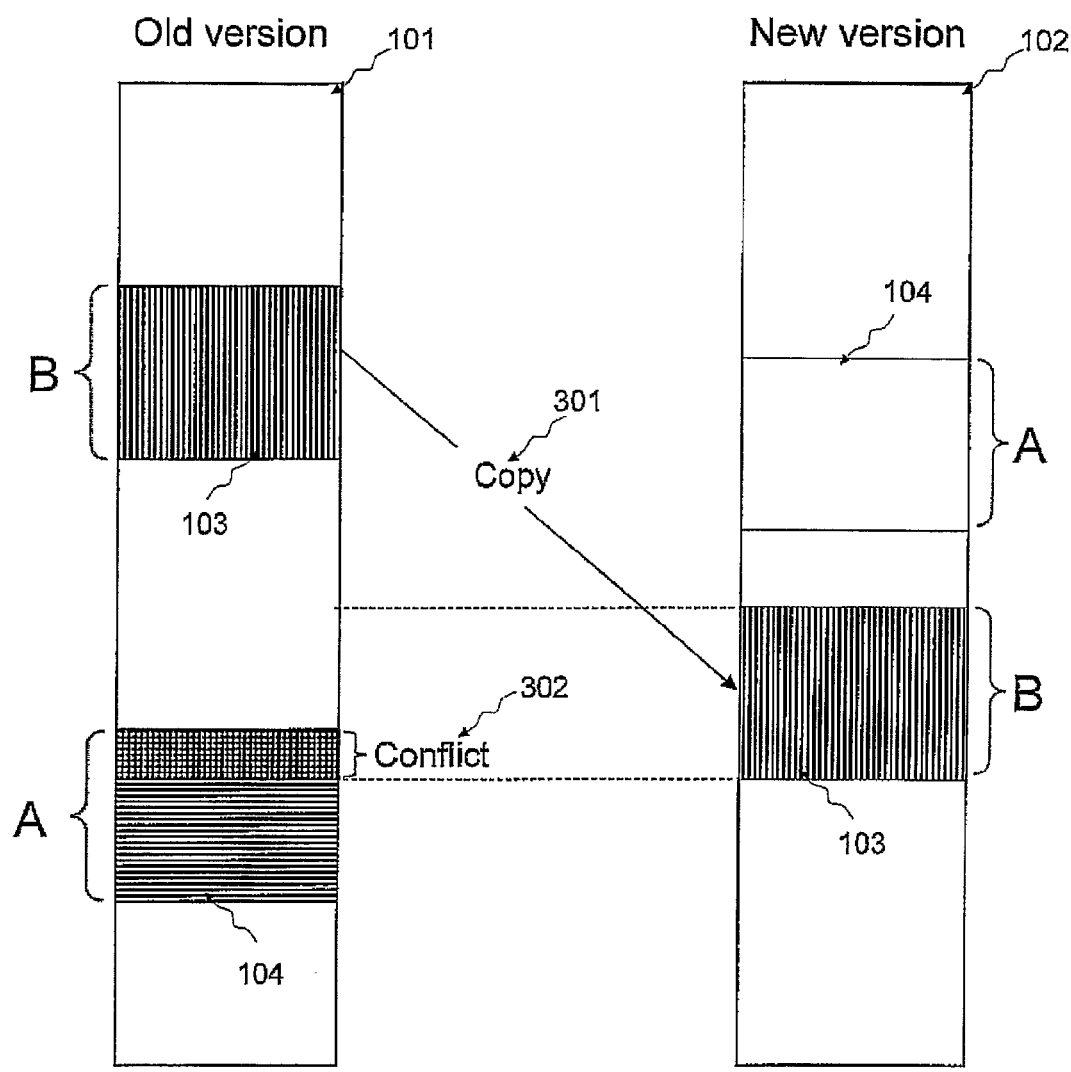
FIG. 3 is a block diagram showing that the block diagram of FIG. 2 creates a copy-cycle leading to un-resolvable conflicts.

Prima facie it is possible, in the example of FIG. 3, to change the copy-order by copying (301) block 103 before copying block 104 thereon. However, as illustrates in FIG. 3, the new location in the storage device of 103 in the new version 102 overlaps with the original location of 104 in the old version 101, which again causes a conflict 302. When there is no copy order that can avoid such conflicts, there is a need to resolved at least one of these conflicts by other means. Both FIGS. 1 and 2 illustrate an example of a copy-cycle, for which a correct copy order for resolving conflicts does not exist. It should be noted that those versed in the art can appreciate that other forms of copy-cycles may exist, where more then two blocks are involved. For example, a cycle of four blocks could be created in the following way: new A overlaps old B, new B overlaps old C, new C overlaps old D and new D overlaps old A.

Figure 4:
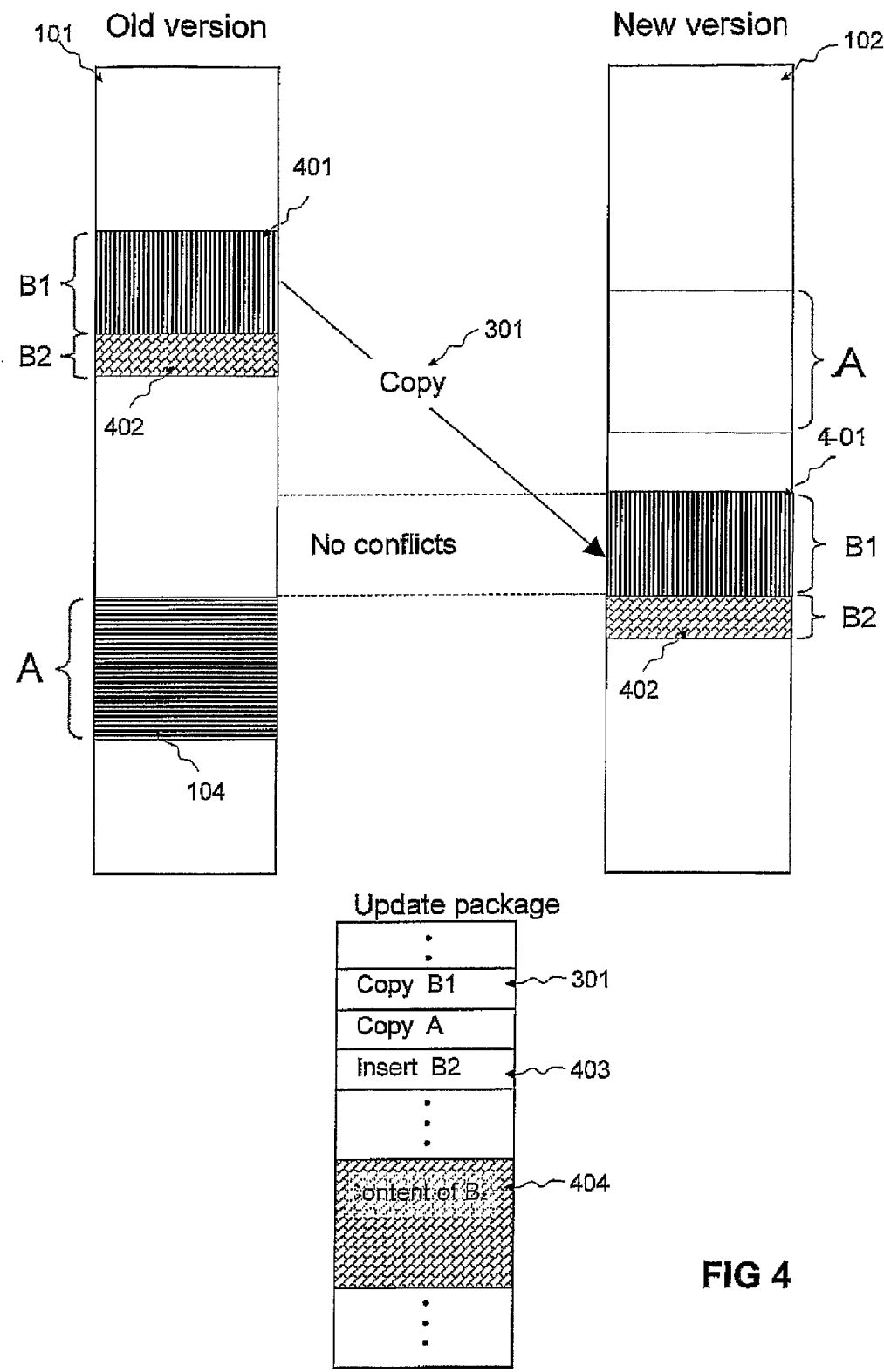
FIG. 4 Is a block diagram illustrating how a conflict is resolved by the prior art, enabling the whole copy-cycle it belongs to, to be properly executed.

FIG. 4 illustrates how a conflict is resolved by the prior art. It should be noted that it is possible to resolve conflicts by several alternatives and the illustration shows an example of a method for selecting one of the conflicts to be actually resolved.

It is appreciated that sometimes the selection is guided by one or more criteria and therefore the selection could be varied, depending on the criteria guiding the selection method. In this particular example, the smallest area of conflict among the areas of conflict (402) belonging to the same copy-cycle is selected. The block B is split into 2 parts: B1 (401) and B2 (402). B1 which does not overlap the area of A in the old version (104) is copied as before, free of conflict. The content of B2 is added to the update package (403) in some form, such as an exact bit copy. The update package is organized in such way that the update process will copy B1 first to its position in the new version since that action does not create any conflict and frees the area where A should reside in the new version. Next, A is copied to its new place and finally B2 is re-constructed, or restored, into its position in the new version, using the instructions (403) and data (404) in the update package. This example illustrates that the size of the update package is increased.

Figure 5:
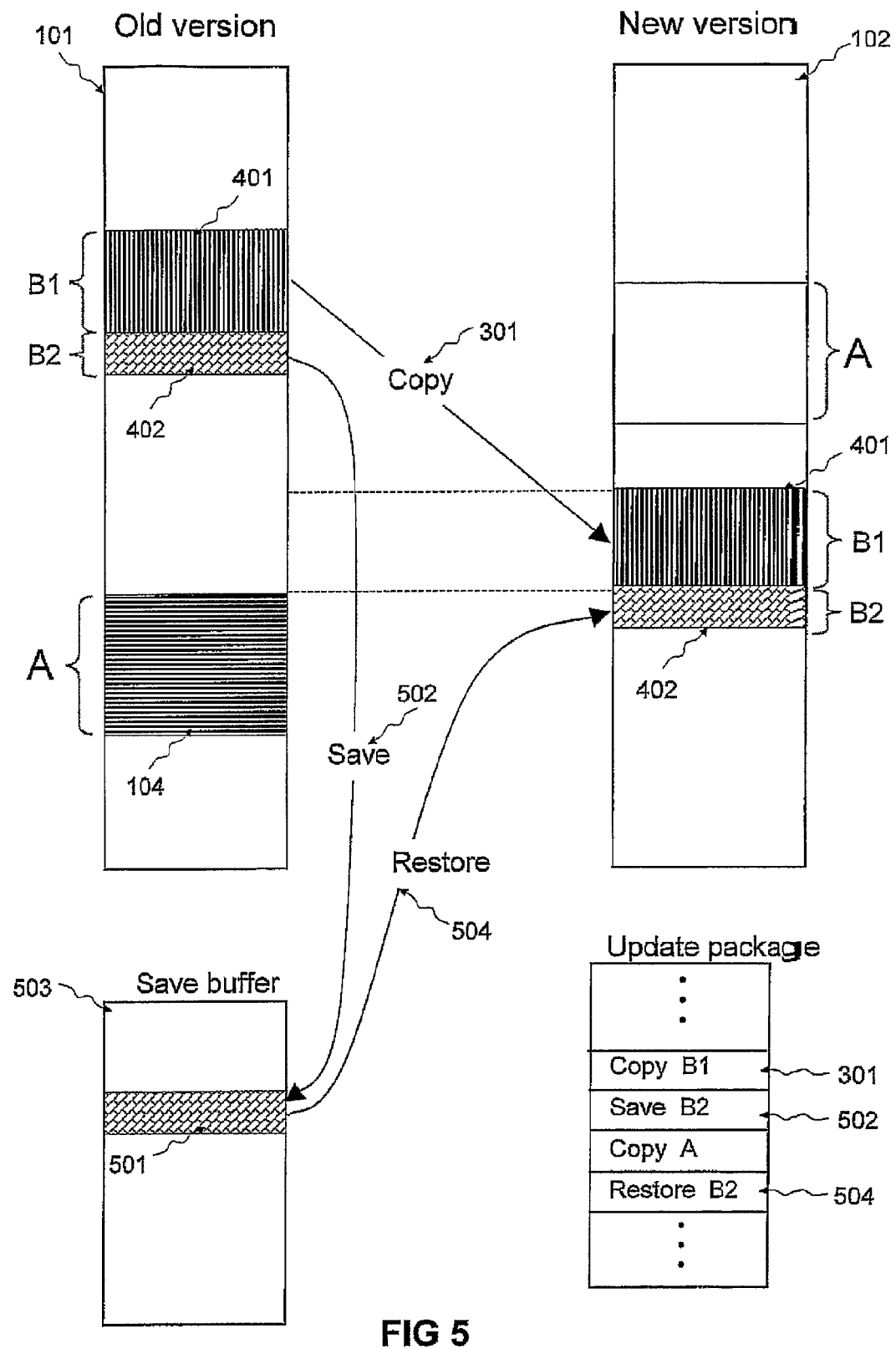
FIG. 5 Is a block diagram illustrating how a conflict can be resolved by the method of the invention.

FIG. 5 illustrates how a selected conflict can be resolved according to one embodiment of the invention, when avoiding significant increase in the size of the update package. Instead of keeping copy of old content stored in areas to be protected in the update package, such as B2 in the example illustrated in FIG. 4, according to the embodiment B2 is being saved (501) by a special protection command (502), such as copy command, into an auxiliary storage buffer (503) which does not take part of the storage used to hold the new version. It is noted that the protection command can be, for example, a copy command that protects the content by storing a copy thereof in the auxiliary storage buffer. The auxiliary storage area can be in the same storage device where the old/new versions are stored, or in another storage device.

The examples in FIGS. 1-5 illustrate simple updating that copies blocks from an old to a new version. It should be noted, however, that those versed in the art will appreciate that other update operations are possible as well, such as modify operations. For example, a modify operation, could be any manipulation such as arithmetic and/or logic operations applied to data. Combinations of different update operations are also possible, for example, a combination of copy and modify operations wherein data is read from the old version, modified and stored onto the new version. It can be appreciated that protection commands can include copy commands, modification commands or combinations. In addition, it can also be appreciated that restoration commands can also include copy commands, modification commands or combinations.

According to one embodiment of the invention it is possible to modify content in parallel to protecting it (i.e., in parallel to storing a copy thereof in auxiliary storage). In such as embodiment the data stored in the auxiliary storage reflects the protected content after it was modified. According to a different embodiment if is possible to modifying protected content in parallel to restoring it. In such an embodiment, the content stored in the new version reflects the data stored in the auxiliary storage area after it is modified. It should be noted that copy and modify combinations are allowed in protection commands, in restoration commands or even in both of them when data is be modified twice.

Once B1 is copied and B2 is saved, the target area of A in the new version can be considered as free (released) area and A can be copied to its new place. Once A has been copied, its former position in the old version is released, the area of B2 is released and can be restored using the data previously saved in the auxiliary buffer, possibly with further manipulations as mentioned earlier. For those versed in the art, it is known that the update package may occupy storage for an indefinite time, between the time it is created on the device and the time it is being actually used and can be discarded. It can also be appreciated that according to the embodiment the auxiliary buffer is temporal and exist during a period of time when the update process operates. When the update process terminates, a short time before, or a short time afterwards, the auxiliary buffer is released. This temporal characteristic of the auxiliary storage allows flexibility of this latter embodiment apart from allowing it to reduce the size of the update package thus it requires less time to be transmitted to the device, in those cases when the update package is transmitted.

Figure 6:
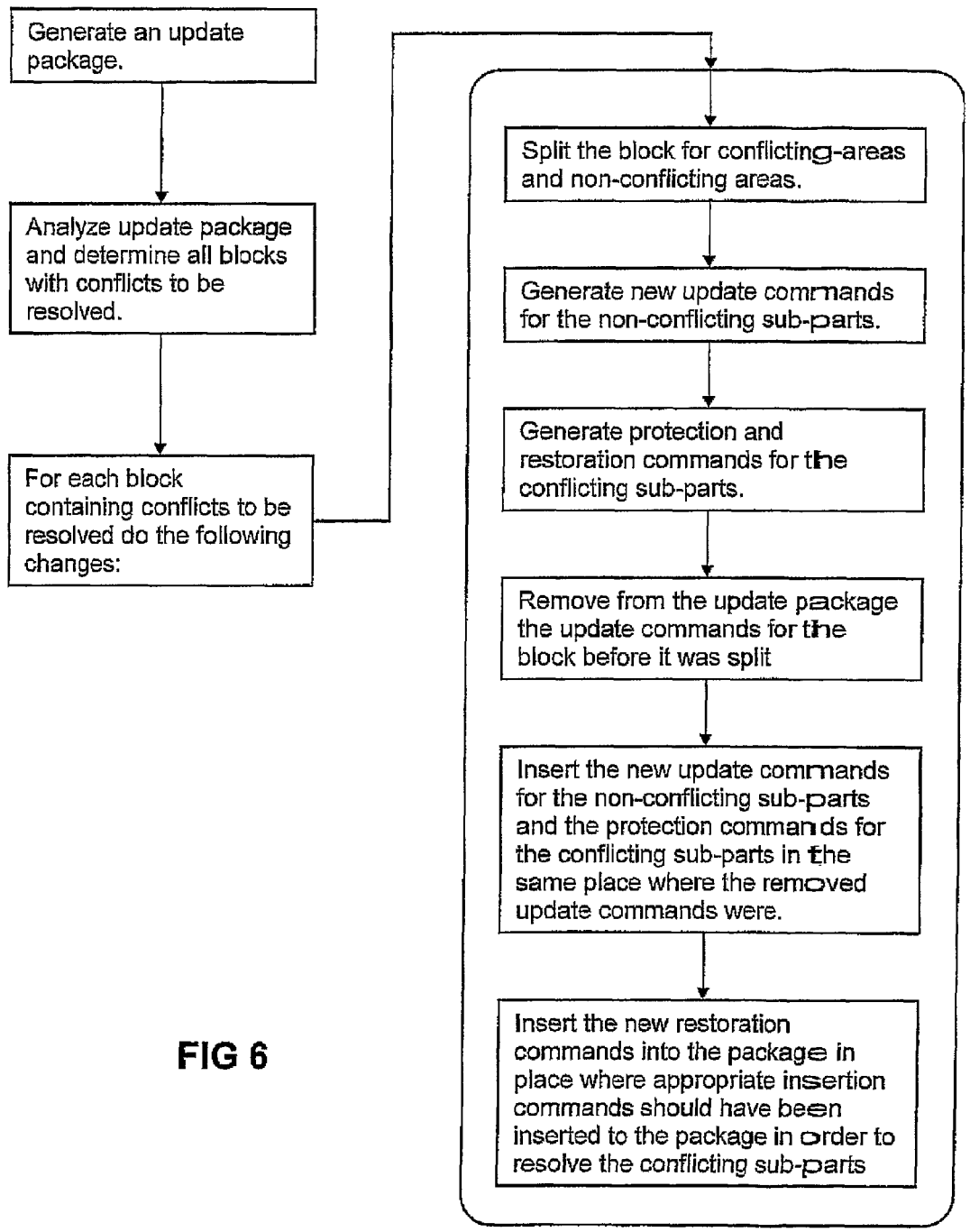
FIG. 6 is a flowchart for a method for generating an update package that resolves conflicts, according to one embodiment of the invention.

FIG. 6 is a flowchart for generating an update package while resolving conflicts, according to one embodiment of the invention. When generating the update package, the method determines conflict areas in a way such as the one suggested by the prior art. Selected blocks including conflict areas are split into conflict areas and non-conflict areas. It should be noted that sometimes the old block can be split into more than two areas, such as when the conflict area is in the middle of the block.

The update package according to the one embodiment should include instructions for protecting the content of the conflicting areas to an auxiliary storage and instructions to restores data from the auxiliary storage into the area of the storage where the new version is created. The above instructions replace the content of the conflicting areas which are inserted to the update package by the methods of the prior art. It should be noted that the auxiliary storage area can be on any storage device accessible by the processor where the update process will execute.

Figure 7:
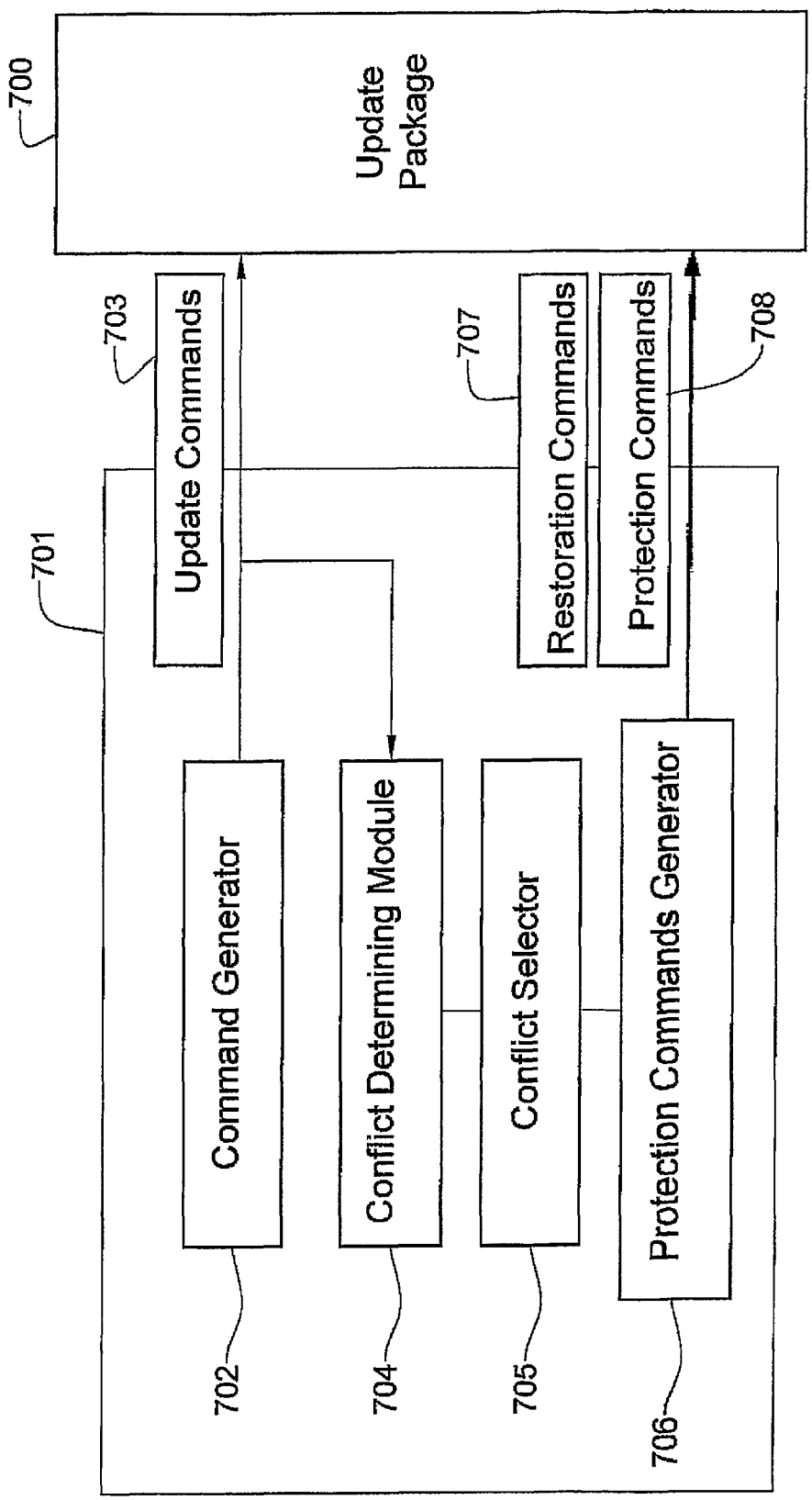
FIG. 7 illustrates an apparatus for generating an update package, in accordance with one embodiment of the invention.

FIG. 7 illustrates an apparatus 701 for generating an update package 700, in accordance with one embodiment of the invention. The update package 700 is capable of in-place updating an old version to a new version, wherein the old and new versions are stored in a storage device.

The apparatus 701 includes a command generator 702. The commands generator inserts update commands 703 into the update package 700. The update commands are capable of updating the old version to said new version.

The apparatus 701 also includes a conflict determining module 704. The conflict determining module 704 checks the update commands 703 and determines whether they create at least one conflict. It is noted that the conflict determining module 704 can read the update commands 703 from the update package 700. Alternatively it can receive the commands directly from the command generator 702.

A conflict selector 705 is coupled with the conflict determining module 704. The conflict selector 705 selects one conflict out of the at least one conflict that the conflict determining module 704 determines. It is noted that if the conflict determining module 704 determines that there are no conflicts generated by the update commands 703, the conflict selector 705 does not select a conflict, of course.

A protection commands generator 706 is coupled with the conflict selector 705. When the conflict selector 705 selects a conflict the protection commands generator 706 generates a protection command 707 and a restoration command 708 that allow resolving the conflict.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, and accordingly those versed in the art will readily appreciate that various alterations and modifications may be carried out without departing from the scope of the following claims:

The invention claimed is:

1. A method for in-place updating an old version of content stored in memory to a new version of content stored in said memory, the method comprising:

obtaining an update package for in-place updating said old version of content to said new version of content, said update package including a sequence of commands including at least (i) update commands for copying content of said old version from one memory location in said memory to another memory location in said memory and (ii) protection commands for protecting content of said old version when at least one update command from the sequence of update commands would otherwise create one or more conflict areas, in which content to be overridden will be required for a subsequent update command, said protection commands including commands for copying said content of said old version of at least said conflict areas to a storage buffer and wherein said conflict areas are included in at least one block of content having been split into said conflict areas and non-conflict areas;

copying content of said old version from one memory location in said memory to another memory location in said memory, according to said update commands in said obtained update package; and protecting, according to said protection commands, the content of said old version of each conflict area of said one or more conflict areas included in said at least one block of content prior to said content of said conflict area being overridden.

2. The method for in-place updating according to claim 1, wherein the update package further includes restoration commands for restoring said protected content of said old version.

3. The method for in-place updating according to claim 2, further comprising:

restoring said protected content of said old version in said storage buffer by copying said protected content from said storage buffer to a block of content including the overridden content.

4. A non-transitory computer readable medium having a computer program product stored thereon for in-place updating an old version of content stored in a memory device to a new version of content, said computer program product for causing a computer to receive an update package, said update package comprising:

a sequence of update commands for copying content of said old version from one memory location in said memory to another memory location in said memory; and protection commands for protecting content of said old version, when at least one update command from said sequence of update commands would otherwise create one or more conflict areas in which content to be overridden will be required for a subsequent update command, said protection commands including commands for copying said content of said old version of at least said one or more conflict areas to a storage buffer, wherein said at least one or more conflict areas are included in at least one block of content having been split into non-conflict areas and said at least one or more conflict areas, and wherein said computer program product further causes said computer to perform said in-place updating in accordance with said received update package so that (i) content of said old version is copied from one memory location in said memory to another memory location in memory and (ii) the content of said old version of each conflict area of said one or more conflict areas of said at least one block of content is protected prior to said content of said one or more conflict areas being overridden.

5. The non-transitory computer readable medium of claim 4, wherein the update package further comprises restoration commands for restoring said protected content of said old version.

6. The non-transitory computer readable medium of claim 4, wherein the received update package further comprises restoration commands for restoring said protected content of said old version in said storage buffer.

7. The non-transitory computer readable medium of claim 6, wherein said restoration commands include commands for copying said protected content of said old version from said storage buffer to one or more blocks of content including the overridden content.

8. A method for generating an update package of in-place updating an old version of content in a memory device to a new version of content, the method comprising:

obtaining a sequence of update commands for copying content of said old version from one memory location in said memory device to another memory location in said memory device;

determining if any of said update commands from said sequence of update commands creates one or more conflict areas wherein content to be overridden would be required by a subsequent update command;

for each block of content containing at least one determined conflict area, splitting the block of content into (i) conflict areas and (ii) non-conflict areas; and generating a protection command for each determined conflict area of said one or more conflict areas of said blocks of content, for protecting the content of said old version of said one or more conflict areas to be overridden, wherein each generated protection command enables copying of said content of said one or more conflict areas of said blocks of content to a storage buffer.

9. The method of claim 8, further comprising:

inserting the protection commands to the sequence of update commands such that a protection command precedes an update command that creates a conflict area wherein content is overridden.

10. The method of claim 8, further comprising:

generating, for each conflict area of said one or more conflict areas, a restoration command for restoring the protected content of each conflict area.

11. The method of claim 10, wherein said generated restoration commands enable copying of said protected content from said storage buffer to one or more blocks of content including conflict areas.

12. The method of claim 8, further comprising:

generating new update commands for copying content of the non-conflict areas to a memory location in said memory whereat content of said old version is not overridden.

13. An apparatus for in-place updating an old version of content to a new version of content, the apparatus comprising:

a memory device for storing said old version of content;

an update package receiver for obtaining an update-package including a sequence of commands including (i) update commands for copying content of said old version from one memory location in said memory device to another memory location in said memory device and (ii) protection commands for protecting content of said old version, when at least one update command would otherwise create one or more conflict areas wherein content to be overridden will be required for a subsequent update command, said protection commands including commands for copying said content of said old version of at least said one or more conflict areas to a storage buffer and wherein said one or more conflict areas are included in at least one block of content having been split into conflict areas and non-conflict areas; and a processor in communication with said update package receiver for executing said in-place updating in accordance with said update package so that (i) content of said old version is copied from one memory location in said memory to another memory location in memory and (ii) the content of said old version of each conflict area of said one or more conflict areas of said at least one block of content is protected prior to said content of each conflict area being overridden.

14. The apparatus of claim 13, wherein the update package further includes restoration commands for restoring said protected content of said old version.

15. The apparatus of claim 13, wherein the update package further includes restoration commands for copying said protected content from said storage buffer to one or more blocks of content including the overridden content.

* * * * *